March 1, 1960  G. DION  2,927,293

PRECISION POTENTIOMETER

Filed Oct. 8, 1957  6 Sheets-Sheet 1

Inventor:
GEORGES DION,

By
Bailey, Stephens & Huettig
Attorneys March 1, 1960  G. DION  2,927,293
PRECISION POTENTIOMETER
Filed Oct. 8, 1957  6 Sheets-Sheet 2

Inventor
GEORGES DION,
By
Bailey, Stephens & Huettig
Attorneys

March 1, 1960  G. DION  2,927,293
PRECISION POTENTIOMETER
Filed Oct. 8, 1957  6 Sheets-Sheet 3

Inventor
GEORGES DION,

By
Bailey, Stephens & Huettig
Attorneys

Inventor:
GEORGES DION

By
Bailey, Stephens & Huettig
Attorneys

March 1, 1960  G. DION  2,927,293
PRECISION POTENTIOMETER
Filed Oct. 8, 1957  6 Sheets-Sheet 5

Inventor
GEORGES DION,
By
Bailey, Stephens & Huettig
Attorneys

March 1, 1960 G. DION 2,927,293
PRECISION POTENTIOMETER
Filed Oct. 8, 1957 6 Sheets-Sheet 6

Inventor
GEORGES DION,
By
Bailey, Stephens & Huettig
Attorneys

United States Patent Office 2,927,293
Patented Mar. 1, 1960

2,927,293

PRECISION POTENTIOMETER

Georges Dion, Villebon-sur-Yvette, France

Application October 8, 1957, Serial No. 688,989

Claims priority, application France October 12, 1956

5 Claims. (Cl. 338—162)

This invention relates to precision potentiometers, that is, principally to potentiometers of the type adapted to operate under low-current or no-current conditions, and having hence a voltage rather than a current output.

Where it is desired to provide satisfactory potentiometers capable of yielding indications to within an accuracy of the order of 1:1000, the many details involved in the structure and operation of the potentiometer must be attended to with extreme care, especially if such accuracy is to be retained after the instrument has been actuated many hundreds of thousand and even millions of times and possibly under more or less deleterious ambient conditions.

The design and development of such precision potentiometers is therefore inherently costly and the cost is further boosted by the fact that the manufacturer will in most cases be required to design and produce a large number of different types of the apparatus, each type intended for some particular application or purpose.

It is one object of this invention to provide a manner of manufacture of precision potentiometers which will make possible the provision of a number of various types of potentiometers adapted to fulfill varied practical requirements and conditions, and which, nevertheless, will involve the use of standard components all identical for a large number of potentiometer types, such types differing essentially from one another only in the manner in which the components are assembled.

Another object of the invention is to provide potentiometers possessing a higher degree of accuracy than what was normally attainable heretofore at substantially equal cost, both with regard to the initial accuracy of the equipment when new, and also to the residual accuracy obtaining after the instrument has been manipulated many hundred thousand times.

The invention relates basically to potentiometers wherein the potentiometer resistance element is built around a core of ringlike or similar form, preferably toroidal. The resistance element may be wound on the ringlike core, e.g. in accordance with some of the teachings disclosed in French Patent No. 1,103,756 to "Les Laboratoires de Physique Appliquée L.E.G.P.A." and in the first patent of addition thereto filed in France December 28, 1955; or alternatively the resistance may be provided in the form of a coating having the desired resistivity, in accordance with now conventional procedures e.g. similar to those used in the so-called printed circuit techniques.

A precision potentiometer especially well suited to a variety of practical requirements is characterized according to this invention in the fact that it comprises means for placing the current or voltage taps of the potentiometer in contact with the annular resistance element, selectively at any of various predetermined positions along said resistance, such positions being defined by the provision of notches or the like formed in an insulating ring or annulus concentrical with the annular resistance element and angularly settable with respect thereto, a portion of at least one of said taps being engageable in and blockable with respect to each of said notches or the like.

Desirably said notches or the like may be provided in a number equal to twelve or an integral multiple of twelve, e.g. 24 or 36.

According to another advantageous feature, the resistance carrying core is arranged to be firmly set and blocked in angular position by means of at least two insulating members one of which is formed as a cradle or the like and the other of which provides a blocking ring or annulus, which insulating members are firmly (yet preferably removably) secured to each other, while the current or voltage taps of the potentiometer are adapted to be partly blocked in or with respect to at least one of said insulating members.

According to one improvement, the taps to be used in connection with the annular potentiometer resistor element are each provided in the form of a conductive element, preferably formed as a unitary stamping, and having a contact-making portion engaging the resistance element substantially edgewise, while being resiliently urged against at least one other portion of the same conductive element.

In accordance with a further improvement, the resistance winding formed on the afore-mentioned annular core serving as a support therefore, comprises a bare conductive wire wound about an enamelled core, the resulting assembly being subjected to a temperature somewhat above softening point of the enamel coating, and subsequently cooled, whereby the desired insulation between adjacent turns is obtained by embedding the wire in the coating.

Referring to yet another improvement of the invention, the means for deriving from the potentiometer a current or voltage output responsive to the angular position of a slider contacting the annular resistor, comprise at least one conductive arm, finger, or the like rigidly secured to said slider so as to be rotatable therewith, and resiliently urged into electric contact engagement with a collector ring normally stationary with respect to said annular resistor.

Further features and advantages of the invention and a number of specific embodiments thereof will be made clear from the ensuing disclosure wherein reference is made to the accompanying drawings:

Fig. 9 is a section on line IX—IX of Fig. 1, showing an insulating ring with an annular resistor wire coaxial therewith, and including voltage tap elements of the type last referred to;

Fig. 32 is a sectional view on line R—R of Fig. 33, showing a potentiometer according to the invention in a modified form of construction thereof, while Figs. 34 to 36 are three views relating to a minor modification or improvement, Fig. 34 being a sectional view on line S—S of Fig. 35 while Figs. 35 and 36 are sectional views respectively on T—T and U—U of Fig. 34.

It should be understood that the drawings and related descriptive portions of the specification are given primarily by way of indication but are in no way restrictive; and further that the figures are drawn to different scales to permit of a clearer representation; moreover, certain elements in the figures have been conventionally enlarged and/or distorted with respect to other elements in the same figure, again in the interests of clarity.

Figures 1, 2, 3, 4, 5, 6, 7, 8:
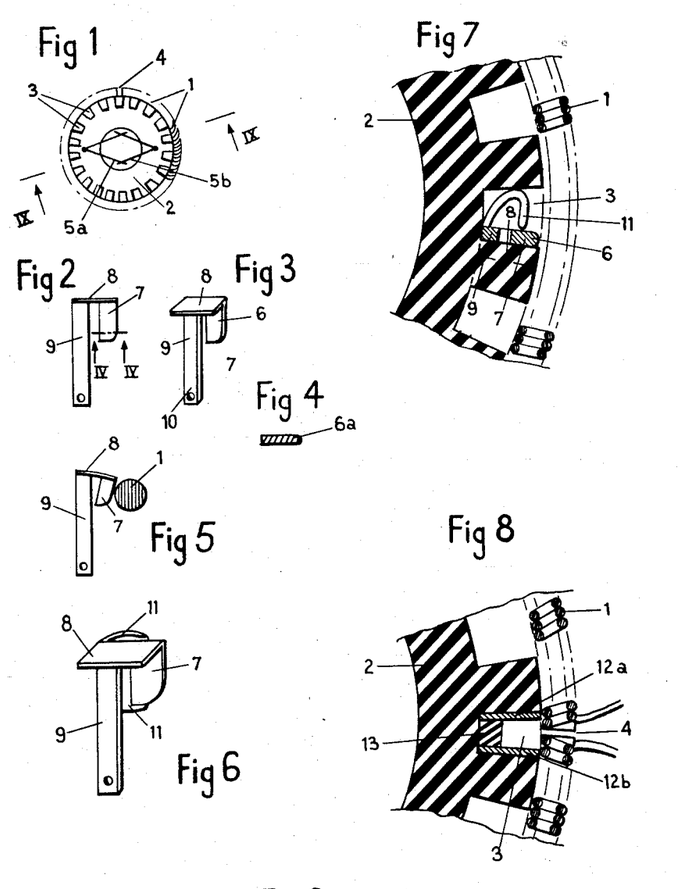
Fig. 1 is a plan view of an insulating ring forming one component of a potentiometer according to the invention.
Figs. 2 to 5 show a voltage tap element desirably provided in such a potentiometer, the figures respectively illustrating the element in elevation, in perspective, in section on line IV—IV of Fig. 2, and in elevation in its contacting condition.
Fig. 6 is a perspective showing of a similar tap or contact element in a modified form.
Fig. 7 is a sectional view drawn to an enlarged scale through an insulating ring or annulus similar to that shown in Fig. 1, provided with a voltage tap element similar to the one shown in Fig. 6.
Fig. 8 is a similar view relating to a modification.

Shown in Fig. 1 is the annular resistance element 1 of a potentiometer. It is assumed hereinafter that said resistance is a wound element and in such event it would desirably be constructed in accordance with the teachings given with reference to Figs. 6 to 8 of French Patent 1,103,756 aforementioned, and/or the teachings given in connection with Fig. 1 of the first addition to said patent also mentioned above.

According to the invention the annular resistance element is constructed in a manner now to be described in detail. It is positioned in mechanical engagement with an insulating annulus or ring 2 concentric therewith and is angularly positioned or set with respect thereto. The insulating ring is desirably provided in the form of a synthetic resin molding. The ring is formed with notches 3 spaced about its outer periphery. The notches define recesses having carefully predetermined dimensions in which the voltage taps are positioned so as to engage accurately predetermined points of the annular resistance. Desirably the notches are provided in a number that is an integral multiple of twelve, such as thirty-six. The notches make it possible to position the voltage taps at various points corresponding to the characteristics specified for the particular potentiometer that it is desired to construct from a given annular resistance 1 and insulating ring 2 both of which may well be standard components permitting of the construction of potentiometers having widely varying characteristics. Thus it is possible:

To provide only two voltage taps corresponding to the ends of an open annular resistance element as shown by the gap 4, both taps being in such case preferably placed in a common notch 3 as will be explained with reference to Fig. 8;

Or to provide three voltage taps spaced 120° from one another along an annular resistance element formed as a closed ring;

Or again provide four voltage taps spaced 90° apart upon a closed annular resistance element e.g. as disclosed per se at E—F—G—H in Fig. 27 of the afore-mentioned first addition to French Patent 1,103,756;

And/or provide voltage taps (in a number which may be as much as seventy in a ring comprising thirty-six notches) serving to provide resistance shunts of predetermined value, positioned between two taps inserted in related notches across various sections of the annular resistance element so as to impart to the latter a desired functional characteristic as disclosed per se at 31 in Fig. 27 of the afore-mentioned first patent of addition.

It will thus be understood that the insulating ring such as 2 with its voltage taps (especially where the taps are provided according to one of the embodiments shown in Figs. 3 to 6) constitutes a standard component for the production of potentiometer units which may be made to correspond to a variety of different laws, applications and/or purposes in the field of precision potentiometer instruments.

Annular resistance elements such as 1 and insulating ring such as 2, as well as a number of other details shown in Figs. 2 to 25, are also shown in the four sets of general assembly views shown in Figs. 26 to 33, to be described in detail hereinafter.

In Fig. 1 there are further diagrammatically shown a pair of V-shaped current take-off brushes 5a and 5b constructed substantially like the brushes 17e and 17d of the afore-mentioned first addition to French Patent 1,103,-756.

The voltage taps to be used in conjunction with the annular resistance element 1 and an insulating ring such as 2 are very desirably provided in the manner now to be described with reference to Figs. 2 to 6.

In this embodiment the voltage tap is so formed as to engage the annular resistor 1 with an edge face 6 of a portion 7 of said tap, which portion is substantially rigid in the plane on which the contact pressure is exerted. The contact action however involves some resiliency owing to the possible bending or flexing of the voltage tap portion 8 (as will be apparent from Fig. 5) which portion 8 is substantially normal to the edge face 6 where contact is made. The voltage tap finally includes a third portion 9 an uppermost part of which serves to assure accurate positioning and blocking of the tap in a notch 3 of insulating ring 2, while the lowermost portion 10 provides for electrical connection of the voltage tap with shunting resistors or with external circuit leads as shown in Figs. 22 to 25.

It will be understood that the three portions of a voltage tap of the kind just described are preferably produced by suitably cutting and forming an integral stamping. The resulting voltage tap element will possess high accuracy in regard to the position of edge face area 6 with respect to the positioning portion 9, as well as comparatively great ruggedness in relation to the small size of the element which in practice may be no more than a few millimeters in length. Desirably the metal used should possess some resiliency. Annealed beryllium bronze has proved particularly satisfactory in this connection.

In accordance with further minor improvements it is desirable that portion 7 including its edge face 6 be surface polished and that the said edge face be rounded off as clearly shown at 6a in Fig. 4. The rounded section may be produced mechanically or more preferably through an electrolytic or etching operation. A coating of precious metal is moreover preferably provided to prevent oxidation.

In the modification shown in Fig. 6 the potentiometer tap or contact element further comprises a resilient tongue portion 11 in addition to the three portions 7—8—9. This resilient tongue portion is formed in the same unitary stamping as the portions 7—8—9 by cutting and press-forming an additional portion of the blank. It serves to block a voltage tap element in a notch such as 3 of an insulator ring 2 without having to use a separate block or shim.

Fig. 7 illustrates on a greatly enlarged scale in section a voltage tap element similar to that shown in Fig. 6, inserted in its notch 3; it will be understood that the tap element is positioned with an extremely high degree of accuracy with respect to one of the side walls of the notch. Fig. 8 illustrates a similar view of the manner in which two voltage tap elements 12a and 12b similar to the element shown in Figs. 2 to 5 is blocked in a notch 3 of insulator ring 2. In this case the two tap elements are respectively disposed along opposite sides of the notch 3 and are blocked in position by means of a separate insulating block or shim 13 inserted between them. Thus high positional accuracy is obtained in this case also. Such an arrangement is of particular advantage in connection with voltage taps provided at the opposite ends of an open annular resistance provided with an opening or gap as at 4 in Fig. 1. This voltage tap arrangement makes it possible to provide an accurately predetermined electrical neutral or idle angle, the accuracy being primarily dependent on the machining accuracy of notch 3 and/or the shims used therein.

Figure 9:
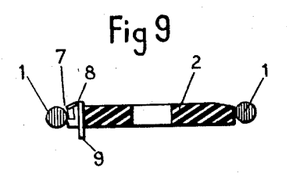
Figure 10:
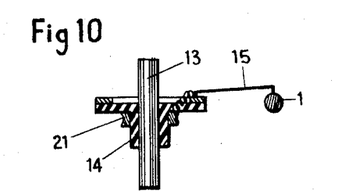
Fig. 10 is a diametrical sectional view principally illustrating a desirable form of slider device for a potentiometer according to the invention.

Referring to Fig. 9 this illustrates a diametric sectional view of the insulator ring 2 with a coaxial annular resistor element 1 and a voltage tap element 7—8—9.

It will be observed that in the embodiments shown in Figs. 1, 7, 8 and 9 the insulator ring 2 or that portion of the ring carrying the voltage taps thereon lies in the mid-plane of annular resistor element 1. In other embodiments however such as that illustrated in Fig. 32 the tap bearing portion of the insulator ring together with the taps carried by it are positioned above or below the annular resistor 1. The embodiment of Figs. 1, 7, 8 and 9 will thus usually be conducive to potentiometer units that are flatter—though larger in diameter—than the units constructed in accordance with Fig. 32.

Figs. 10 to 20 relate to desirable forms of slider and contact brush devices constructed in accordance with the invention.

The slider assembly is mounted on a shaft 13 for bodily rotation therewith. The shaft carries an insulator ring member 14 forming one element of a slider-carrier and which member when seen in plan view (Figs. 11 and 15) may be of any suitable form for supporting the several sliders to be carried thereby; the sliders may be provided in any suitable number as from one to four depending on the particular application.

Figure 11:
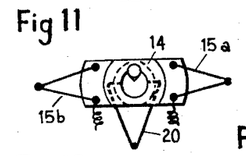
Fig. 11 is a plan view of a slider carrier member.
Figure 20:
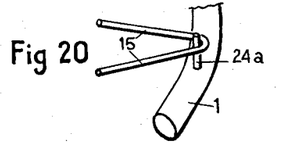
Fig. 20 is a perspective view of the slider shown engaging an annular resistance element.

Each slider preferably comprises a metal contact carrier 15 which is substantially V-shaped in a plane parallel to the mid-plane of annular resistor 1 (Figs. 11 and 20). The slider carries the resistor-engaging contact element adjacent to the apex of the V. The V-shape imparted to the contact-carrier imparts high resiliency to it normally to its plane, while imparting adequate rigidity in the plane of the V. As a result of the said resiliency a satisfactorily resilient contact pressure is exerted against the resistance. And due to the said rigidity the effective angular position of the contact point is strictly determined by the angular position of the supporting ring 14.

Now, in accordance with another improvement of the invention, the supporting ring is angularly positioned and blocked on shaft 13 under equally accurate conditions and in a manner greatly facilitating assembly as will be described.

According to this improvement the shaft 13 and ring 14 are each formed with a notch 16 (Figs. 15 to 17) and 17 respectively. The notches are adapted to be positioned in registering relation so as to define a substantially closed recess which is adapted to receive a pin or dowel element serving to block the assembly in relative angular position. Preferably one of the notches e.g. the notch in shaft 13 is V-shaped (Figs. 15 and 17) while the other notch is semi-circular in contour. This will ensure a particularly accurate setting.

Figures 17, 18:
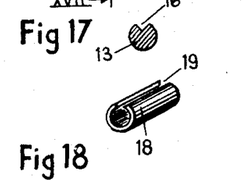
Fig. 17 is a sectional view of the shaft on line XVII—XVII of Fig. 16.
Fig. 18 illustrates a blocking pin used in connection therewith.

Preferably the pin or dowel inserted into the recess comprises a tubular element 18 longitudinally slotted as at 19 and possessing some resiliency as shown in Fig. 18. To insert this particular pin into the recess 16—17 requires slight compression. It will be understood that the above-described set of measures relating to the angular positioning of ring 14 on shaft 13 will impart great accuracy to the angular setting thereby contributing to impart high precision to the potentiometer as a whole.

Desirably the notch 16 in shaft 13 may be made to extend, continuously or non-continuously, as far as the extremity of said shaft 13 outside the potentiometer casing. Such an extension will then provide an externally visible index indicating the angular position of the slider or sliders within the instrument. This may be found especially useful in connection with some types of calibrating and testing operations.

Where a multi-resistance single-shaft potentiometer is to be provided (as in Figs. 28 and 30) the respective notches 16 are preferably provided in alignment with one another and may be formed as a single continuous longitudinal slot if desired. This yields an advantage in that the alignment or relative setting of the sliders in the respective constituent potentiometers may then be effected in an especially satisfactory manner: thus since the respective slider-support rings 14 are angularly positioned with respect to one another with high accuracy as a result of the feature just described, it is simply necessary to mount thereon the contacts and contact supports by means of a suitable jig or pattern, in order to obtain a correspondingly high degree of accuracy in the angular positions of the actual contacts.

The electrical contact with annular resistor 1 being established by means of a slider 15 (or 15a—15b where two sliders are present) preferably similar to that just described, the voltage thus taken off by the slider is in turn led out of the potentiometer by way of a member which constitutes a stationary brush relatively to the parts rotating with the slider. Desirably each brush relating to a particular slider is generally V-shaped in a manner known per se and as shown at 20 in Figs. 11 to 13, with the ends of the legs of the V engaging a circumferential groove formed in a conductive bushing 21, surrounding the potentiometer shaft 13.

Figure 12:
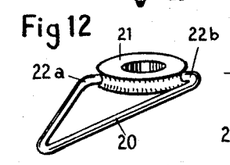
Fig. 12 is a perspecitve showing of a voltage pick-off brush constructed according to one desirable embodiment.
Figure 13:
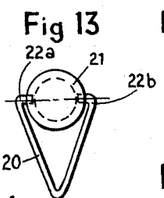
Fig. 13 is a plan view of the same.

In accordance however with a minor improvement of the invention the leg ends of the V brush 20 are bent inwards so that the said ends will bear with their end faces against the bottom of the groove in bushing 21, being substantially directed radially towards the center of the brushing as shown at 22a—22b in Figs. 12 and 13. The end-most faces of the V legs which bear against said groove are preferably initially shaped to conform with the sectional contour of the groove.

Figure 14:
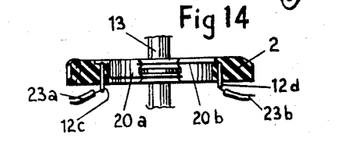
Fig. 14 shows in perspective the construction of a generally similar assembly including two brushes rather than one, with the related output terminals in the insulating ring member.
Figure 15:
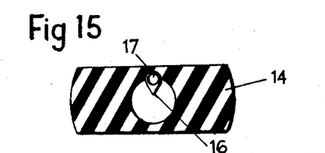
Fig. 15 illustrates, to a larger scale than that of Fig. 11, one desirable embodiment of an angular setting and blocking arrangement for the slider supporting member.
Figure 16:
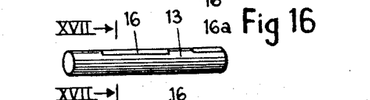
Fig. 16 illustrates in perspective the potentiometer shaft, in the area thereof receiving the slider-carrier, in the form of embodiment just mentioned.

The potentiometer includes as many brushes formed as just described, as there are sliders. Where there are two sliders and hence two brushes as shown in Fig. 14 at 20a and 20b, there will also be two contact bushings. Where the brushes thus constructed are included in a potentiometer having an insulating ring 2 as described above, the said brushes are secured to the ring and their outlet connections are effected by way of connector terminals 12c and 12d desirably in the form of tubular rivets and having the leads 23a and 23b extending therefrom.

Figure 19:
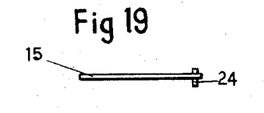
Fig. 19 is an elevational view of a slider constructed in accordance with a minor improvement.

A further improvement of the invention relates to the construction of the actual contact of the slider with the annular resistor. This is illustrated in Figs. 19 and 20. The arrangement consists in the fact that the said contact itself is formed as a metal platelet strip or wire element positioned near the apex of the V-shaped contact carrier 15, which platelet, strip or wire extends in a direction substantially normal to the plane of the contact carrier. As a result, the strip or wire 24 or 24a makes effective contact with annular resistor 1 by way of its end face, with the contact pressure being assured through the resiliency of the contact carrier 15 in the direction of said contact. It may here be noted that another desirable embodiment of a slider-and-voltage-output-brush assembly will be described below with reference to Figs. 32 and 33.

Figure 21:
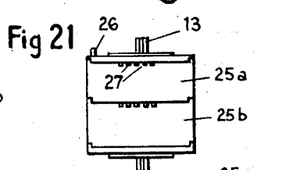
Figs. 21 to 25 are various views illustrating one embodiment of the electrical output means provided in a potentiometer of the invention.

Each elementary or component potentiometer according to the invention is positioned within a metal casing such as 25a and 25b (Fig. 21) as more completely disclosed with reference to Figs. 26 to 31. Preferably a pin 26 (Fig. 21) is provided projecting from one of the circular base surfaces of the metal casing. When the annular resistor 1 is angularly positioned at a predetermined setting in the said casing the pin 26 will serve as an external marker indicating the particular angular setting of the annular resistor.

Where a multiple or manifold potentiometer unit is to be provided such as the twofold potentiometer of Fig. 21, the index pin such as 26 would be made to extend through the respective casings and through the end flanges of the assembly in which the shaft bearings are supported, and with end flanges define the ends of the potentiometer unit. The pin will thus, in particular, assure the desired angular setting of the resistances in each potentiometer with respect to one another.

Figure 22:
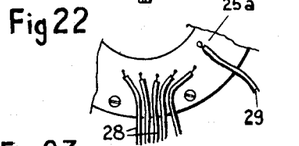
Figure 23:
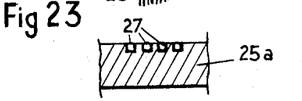
Figure 24:
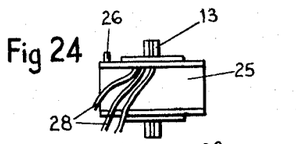
Figure 25:
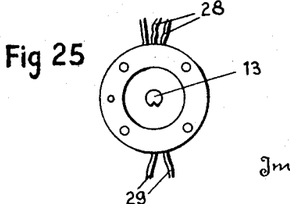

The voltage taps of the potentiometer are connected with the external circuit by way of connecting leads let out through apertures or slots 27 (Figs. 21 and 23) formed in each casing. The connecting leads may, if desired, be separated into groups as shown in Figs. 22 and 25 where there is shown on one hand a set of connecting leads 27, and on the other one or two further leads 29. The leads are desirably adhesively bonded where they extend through the slots such as 27, e.g. with a synthetic resin-base varnish composition.

Thus having described a number of improvements according to the invention with reference to Figs. 1 to 25, reference will next be made to Figs. 26 to 31 which illustrate three pairs of general views of potentiometer units or assemblies including such improvements.

In all three potentiometer units shown the insulating ring 2 is positioned in a metal casing 25 or 25a—25b, and is preferably bonded therein with a synthetic resin-base adhesive composition. Annular resistor 1 or 1a and 1b is positioned upon an internal shoulder or flange 30 provided for that purpose within the casing, with an insulating seating washer 31, desirably made of aluminum aluminite or the like, inserted between the element and the flange. The resulting potentiometer unit has a high coefficient of heat dissipation with respect to its weight and volume.

Figure 26:
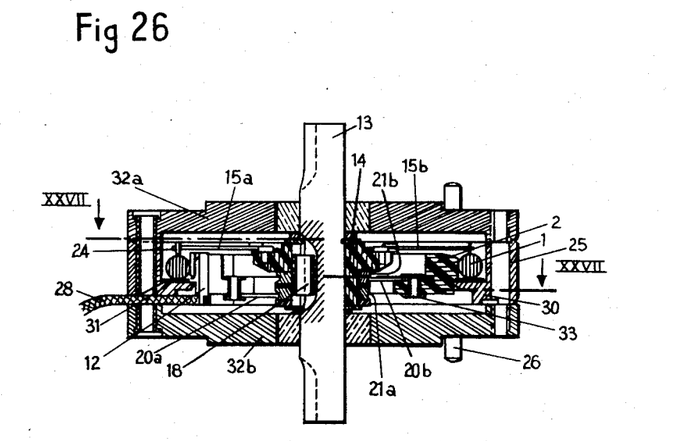
Figs. 26 and 27 are sections on lines XXVI—XXVI of Fig. 27 and XXVII—XXVII of Fig. 29, respectively, showing a potentiometer according to the invention employing a single annular resistance element.
Figure 27:
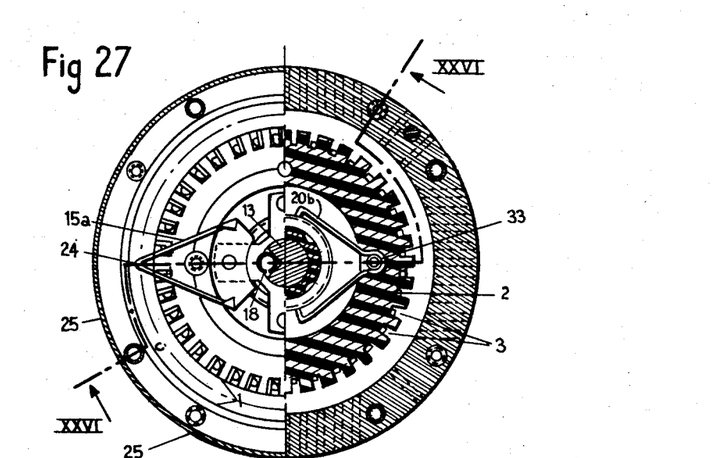

Figs. 26 and 27 relate to a single-resistance potentiometer i.e. having only one annular resistor. The potentiometer chiefly includes:

Annual resistor 1;

Insulator ring 2 carrying the voltage taps therein;

Metal casing 25 with inner annular flange 30 having bonded to it the insulator ring 2 carrying the voltage taps such as 12;

An electric outlet connection 28;

End flanges 32a and 32b;

The contacts 24 of each of the two sliders of the potentiometer with their contact carriers 15a—15b carried in turn by the slider-supporting ring 14;

Dowel pin 18 for blocking the ring 14 in the desired angular setting with respect to potentiometer shaft 13, said pin comprising a slotted tubular element 18;

The two brushes 20a and 20b each with its securing means 33;

Bushings 21a and 21b against which the brushes bear;

And pin 26 indicating the angular setting of the potentiometer.

Figure 28:
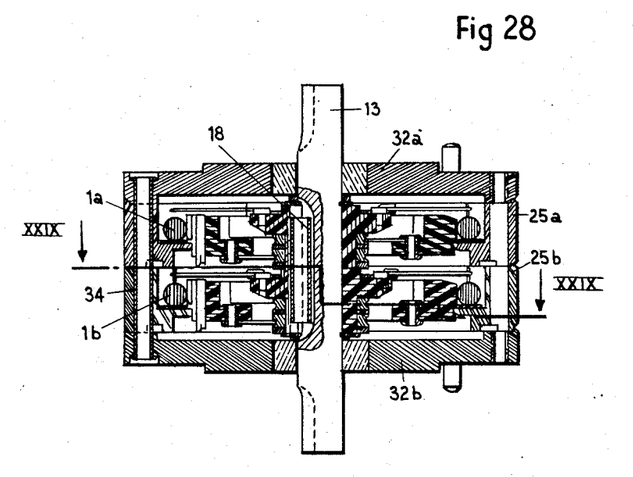
Figs. 28 and 29 are similar sectional views respectively on lines XXVIII—XXVIII of Fig. 29 and XXIX—XXIX of Fig. 28, of a dual resistance potentiometer according to the invention.
Figure 29:
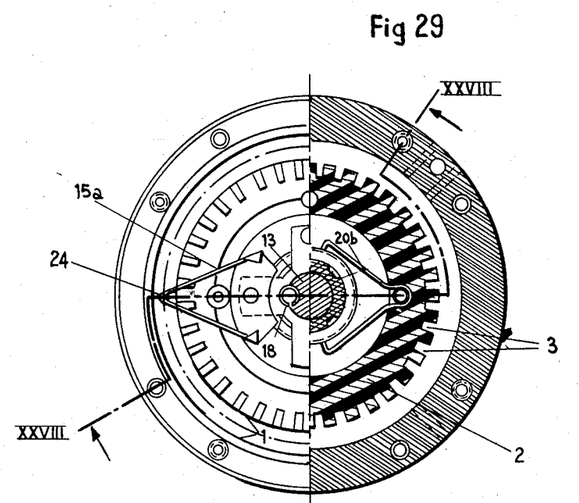

Figs. 28 and 29 relate to a dual potentiometer including the two annular resistors 1a and 1b. Each component potentiometer in the dual assembly is generally built like the single potentiometer shown in Figs. 26 and 27 except, first, that the dual potentiometer has a single rotary shaft 13 and also has a single dowel pin 18 for both slider-carrier rings 14a and 14b; and secondly that the casings 25a and 25b are assembled by means of tubular rivets 34 or the like without any intermediate separating wall or flange, so that the dual potentiometer only comprises the two end flanges 32a and 32b similar in this respect to the single-resistance potentiometer.

Figure 30:
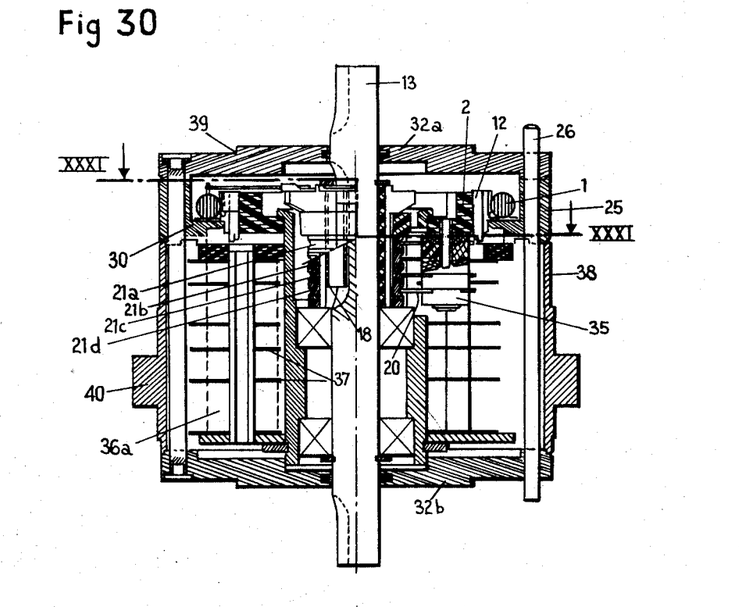
Figs. 30 and 31 are similar sections respectively on lines XXX—XXX Fig. 31 and XXXI—XXXI Fig. 30 of a so-called functional potentiometer according to the invention.
Figure 31:
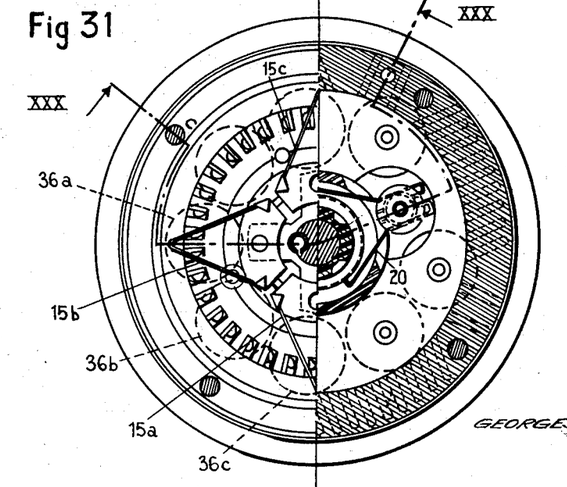

Referring next to Figs. 30 and 31 these illustrate the invention as embodied in a functional potentiometer, that is, a potentiometer wherein the output voltage represents some predetermined mathematical or physical function or the input voltage (or voltages) with an independent variable being provided by the angular position of the slider or sliders.

Such a functional potentiometer is herein provided in a manner known per se, by means of complementary resistances of suitable value shunting various selected sections of the annular resistor of the said potentiometer. It will be noted that, as indicated hereinabove, the connections of such complementary resistances with the respective sections of the main resistance are very desirably also provided in the form of voltage tap elements constructed in accordance with the invention.

With regard to the majority of its component parts the functional potentiometer now described is constructed similar to the single-resistance potentiometer of Figs. 26 and 27, including the annual resistor 1; insulator ring 2; casing 25 and annular inner flange 30; voltage taps 12; shaft 13; slotted tubular dowel element 18 for determining the angular setting of the respective slider-carriers; and pin 26 for the angular setting of the potentiometer which pin is in the form of a rod extending through the potentiometer from end to end.

However the potentiometer shown comprises four sliders comprising the contact carriers 15a, 15b, 15c and 15d, only the first three of which are partly shown in Fig. 31. Corresponding with the four sliders are four contact bushings 21a, 21b, 21c and 21d, each of which is engaged by a brush 20. And the four brushes 20 are supported from a post 35.

Further, the connecting wires are led into the potentiometer and are connected to the abovementioned shunt resistances which serve to accomplish the desired anamorphosis or mathematical transformation. The shunting resistors may for example be provided thirty-six in number, where the potentiometer includes thirty-six voltage taps. Said resistors are usually wound elements and in such case each may desirably be provided in the form of a sectional winding 36a—36b—36c &c., with said windings extending parallel to the axis of potentiometer shaft 13 and each including at respective levels a plurality of shunt resistors preferably separated by partitions 37.

The windings in which the shunt resistors are thus combined are received within a housing 38 placed under the metal casing of the annular resistor, in alignment therewith, and preferably there is no separating wall provided therebetween; in this way the resulting potentiometer as a whole includes only the two end flanges 32a, 32b as in previously described instances.

A potentiometer unit according to the invention further advantageously comprises a shoulder 39 formed on its end flanges to facilitate centering of it on assembly; and/or a mounting flange 40 projecting from its side wall.

Figure 32:
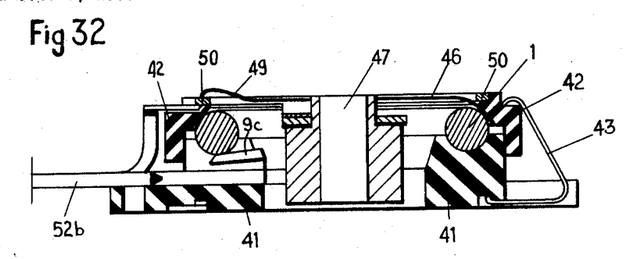
Figure 33:
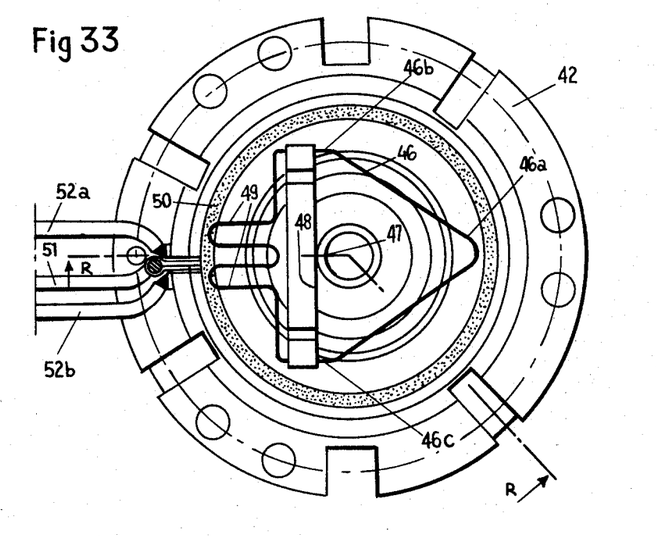
Fig. 33 is a plan view of the same potentiometer.

In the embodiment of a potentiometer according to the invention shown in Figs. 32 and 33 the wound annular core 1 is angularly set and firmly blocked in its setting, essentially by the action of two insulator members. One 41 of these parts acts as a cradle or the like for the annular resistor while the other part 42 provides a backing ring. Both parts 41 and 42 are furthermore firmly (and desirably removably) assembled to each other, though preferably they are preliminarily pressed against each other with any suitable mechanical jig assembly. The unit in the illustrated embodiment is finally assembled and retained in assembly by means of clamps or straps such as 43 only a small number of which are required such as three of four.

As a result of the arrangement described the meridian line of the annular resistor core normally occupies a position that is strictly and accurately defined, so that the contact between the conductive wire and the current or voltage taps is even better and more reliable than in the embodiment of Figs. 1—7—8—9; and in addition to this the pressure and resilient flexing conditions of the current or voltage taps are determined with even greater rigor owing to the higher rigidity of the relative positioning between the parts.

The embodiment of Figs. 32 and 33 further involves an improvement as regards the means for deriving from the potentiometer a current or voltage output varying in value as a function of the angular setting of a conductive slider in electrical contact with the wound resistor of said potentiometer.

The means conventionally used for that purpose have heretofore comprised a brush that is substantially stationary (disregarding a certain resiliency) frictionally engaging a movable conductive shaft connected with the aforementioned slider for example in the general manner described in detail with reference to the embodiments of Figs. 10 to 14.

According to the corresponding improvement illustrated in Figs. 32 and 33 a conductive finger or arm or the like is connected with the slider for rotation therewith (though a suitable amount of resiliency is provided between both parts) and is resiliently applied against a collector ring or the like in electrical contact therewith, which ring is normally stationary.

More specifically the slider comprises a resilient wire 46 shaped substantially to define two sides of a triangle. The slider is movable with potentiometer shaft 47. However its ends 46b—46c remote from the apex 46a contacting the resistor are preferably positioned beyond the axis of shaft 47 thereby to enhance the flexibility of the slider.

The said ends 46b and 46c are connected with a small cross bar 48 secured to shaft 47. The cross bar carries the aforementioned conductive finger or arm. The arm is herein provided in the form of a conductive wire shaped to a particular configuration as shown at 49 so as to impart to it high resiliency in the direction of contact pressure. The said configuration as shown involves a double bend or sinuosity.

As regards the collector ring or the like frictionally engaged by the sinuous finger 49 this is shown at 50 and is shown strippled in Fig. 33 for greater clarity. One of the potentiometer leads 51 is connected with the collector ring while the other two leads shown, 52a and 52b, are respectively connected to the opposite ends of the resistance winding by way of end current or voltage taps such as those described presently with reference to Figs. 34 and 35.

The improvements thus provided in the means for deriving a variable output from the instrument have a number of advantages including: simpler assembly and subsequent replacement of parts; improved electrical contacts and reduced wear, this being especially due to the resiliency of the parts. This improvement consequently further contributes to an increase in the initial precision of the potentiometer and in the retention of such precision in service.

Figure 34:
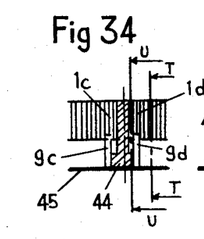
Figure 35:
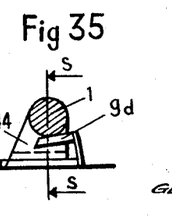
Figure 36:
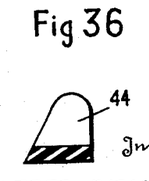

Figs. 34 to 36 illustrate yet another improvement relating to the adjacent ends of an annular core carrying a resistor having its opposite ends projecting to either side of a narrow gap defined between the said ends of the annular core. According to this improvement there is associated with the said ends 1c and 1d and/or with said gap, an insulator part such as 44 which serves at least two of the following three functions, namely: blocking the two current or voltage taps 9c and 9d in a desired angular setting with respect to the ends of the conductor winding; providing safer insulation for both ends of the winding; and contributing to the positioning of the annulus or ring 1c—1d, in that the insulator part 44 is supported for this purpose at 45 against a suitable portion of the insulator part 41 which provides a cradle for the annulus 1—1c—1d.

The insulator part 44 preferably is a synthetic resin molding. One particularly suitable type of resin for this purpose is that known by the trade name Teflon.

More specifically in the example illustrated herein insulator member 44 as viewed in Fig. 34 is in the shape of an inverted T; and as viewed in Figs. 35 and 36 its contour somewhat resembles that of certain types of aircraft wings with a warped portion 44a shaped somewhat after the fashion of an arch-buttress directed outward from the annulus 1—1c—1d.

The said insulator 44 thus replaces a number of separate devices as heretofore used under similar circumstances in connection with potentiometers, and which frequently have included: an insulating adhesive coating interposed between the two end taps of the potentiometer; and an insulating varnish coating inserted between the ends of the winding and providing a mechanical insulation for the annulus.

With reference to the windings provided in potentiometers according to the invention around annular supporting cores, such windings were heretofore usually formed from wire that was insulated in advance, such insulation being frequently provided by a coating of enamel or oxide. In order, on such a winding, to provide both current or voltage taps and one or more movable sliders the wound wire was laid bare of insulation in appropirate areas subsequent to the winding step. Such procedure however was both difficult and unsatisfactory, especially in that it was liable to impair the linearity and evenly polished surface condition of the wire, resulting in production difficulties and increased costs; as well as in reducing the accuracy of the resulting potentiometer.

According to an improvement provided by the invention, the following procedure is advantageously followed: the core around which the winding is to be coiled is enamelled; then the winding is formed using bare wire; next the assembly is heated to a temperature slightly higher than the softening point of the enamel (which latter is usually about 200° C.). Since the expansion factor of the core is usually higher than that of the wire the wire becomes embedded in the softened enamel during the heating step while at the same time the enamel expands. The assembly is then allowed to cool and this will often further increase the penetration of the wire into the coat of enamel since the wire tends to cool off faster than does the enamel and the core. Finally after cooling, the wire is found to be thoroughly embedded in the solidified coating of enamel; and consequently the respective turns of wire are insulated from one another as required.

This method of providing annular resistors for precision potentiometers of the type wherein the wire has to be stripped of insulation in predetermined areas has a number of important advantages. One is to enable the use of bare wire; another is to eliminate the usual step involving impregnation of the winding, which is always a delicate operation and is apt to impair the ultimate surface cleanliness of the winding. The method of making annular resistances according to the improvement just described, on the other hand, is found highly advantageous from many standpoints when applied to various precision potentiometer windings and particularly to windings formed from conductive wire having a gauge diameter in the range of from $1/100$ to $10/100$ of one millimeter wound around a toroidal core a few millimeters in cross sectional diameter.

Following this process and regardless of the particular embodiment of the invention used, precision potentiometers are obtained whereof the advantageous characteristics should appear with sufficient clarity from the foregoing so that additional explanation should be superfluous.

Such potentiometers exhibit definite advantages including the possibility of standard pre-fabrication to produce final potentiometers in a wide range of types and sizes corresponding to various purposes, all such potentiometers possessing outstanding ruggedness and accuracy.

As already mentioned the invention is in no way restricted to the particular applications and particular embodiments of the various component part thereof, which have been specifically disclosed, but encompasses variations therein, and particularly the modification wherein the potential taps and cooperating elements are so dimensioned and arranged as to enable them to withstand substantial current loads.

What I claim is:

1. In a potentiometer device, in combination, an annular resistance, a first annular insulator member coaxial with the resistance and formed with an annular groove cradling said resistance therein, and a second annular insulator member coaxial with the first member and formed with an annular surface engageable over said resistance to block it in cradled condition, means releasably clamping said members against each other with the resistance blocked therebetween, a plurality of notches formed in one of said members and voltage tap means in at least one of said notches electrically engaging said resistance, and slider contact means engaging said resistance and angularly adjustable with respect thereto.

2. The combination claimed in claim 1, wherein said notches are provided in a number equal to an integral multiple of twelve.

3. In a potentiometer device, in combination, an annular resistance, an annular insulator member coaxial with the resistance and angularly settable with respect thereto, a plurality of notches formed in said member in angularly spaced relation thereon, voltage taps in said notches electrically engaging said resistance, a rotatable potentiometer shaft coaxial with said resistance, and slider contact means secured to and projecting from said shaft and engaging said resistance for adjustment thereon independently of the angular setting of said annular members, each voltage tap comprising a supporting portion seated in said notch, a contact-making portion engaging said resistance, and an intermediate portion interconnecting both first-mentioned portions, said first-mentioned portions being formed to present substantial rigidity in the direction of pressure of said contact and said intermediate portion being formed to present substantial resilient flexibility in said direction of contact pressure to permit deflection of said contact-making portion towards said supporting portion under said contact pressure, said contact-making portion being flat and having its edge in engagement with the resistance element and lying in a plane intersecting said element.

4. In a potentiometer device as claimed in claim 3, said resistance element having a relatively narrow gap between opposite ends thereof, an annular insulator member coaxial with said element and angularly settable relative thereto, one of said notches in said member registering with said gap, a pair of conductive voltage taps positioned in said notch against opposite walls thereof and making electric contact with said resistance element adjacent said opposite ends thereof, an insulator insert positioned in said notch between said voltage tap elements for blocking said elements in the notch and insulating said elements from each other, said insert including an upwardly projecting portion extending into said gap in the resistance element for separating and insulating said ends thereof from each other.

5. In a potentiometer device, in combination, an annular resistance element, annular insulator means coaxial and angularly adjustable relative to said element, notches in said insulator means angularly spaced therearound, and conductive elements seated in said notches and electrically engageable with said resistance each element comprising a supporting portion seated in said notch, a contact-making portion engaging said resistance, and an intermediate portion interconnecting both first-mentioned portions, said first-mentioned portions being formed to present substantial rigidity in the direction of pressure of said contact and said intermediate portion being formed to present substantial resilient flexibility in said direction of contact pressure to permit deflection of said contact-making portion towards said supporting portion under said contact pressure, said contact element comprising a press-formed strip of springy metal cut and formed to provide supporting and contact-making strip portions lying generally in a common plane and with the contact-making strip portion contacting the resistance element by a narrow edge surface thereof, and with the intermediate interconnecting strip portion lying generally in a plane normal to said common plane to present substantial flexibility normally to said plane.

References Cited in the file of this patent

UNITED STATES PATENTS

| | | |
|---|---|---|
| 1,783,542 | Merle | Dec. 2, 1930 |
| 2,495,321 | Gibbs et al. | Jan. 24, 1950 |
| 2,619,570 | Takats | Nov. 25, 1952 |
| 2,778,906 | Burgess | Jan. 22, 1957 |
| 2,782,288 | Weld | Feb. 19, 1957 |
| 2,798,926 | Mucher | July 9, 1957 |
| 2,799,756 | Graham | July 16, 1957 |

FOREIGN PATENTS

| | | |
|---|---|---|
| 1,103,756 | France | June 1, 1955 |